US011677274B2

(12) United States Patent
Zeine et al.

(10) Patent No.: US 11,677,274 B2
(45) Date of Patent: Jun. 13, 2023

(54) DISTRIBUTED WIRELESS POWER TRANSMISSION SYSTEM

(71) Applicant: OSSIA INC., Redmond, WA (US)

(72) Inventors: Hatem I. Zeine, Bellevue, WA (US); Philip L. Swan, Redmond, WA (US)

(73) Assignee: OSSIA INC., Redmond, WA (US)

( * ) Notice: Subject to any disclaimer, the term of this patent is extended or adjusted under 35 U.S.C. 154(b) by 0 days.

(21) Appl. No.: 17/866,723

(22) Filed: Jul. 18, 2022

(65) Prior Publication Data
US 2022/0376556 A1 Nov. 24, 2022

Related U.S. Application Data

(63) Continuation of application No. 16/205,332, filed on Nov. 30, 2018, now Pat. No. 11,394,248.

(51) Int. Cl.
H02J 50/20 (2016.01)
H02J 50/80 (2016.01)
H02J 50/40 (2016.01)

(52) U.S. Cl.
CPC ............ *H02J 50/20* (2016.02); *H02J 50/402* (2020.01); *H02J 50/80* (2016.02)

(58) Field of Classification Search
CPC .................................. H02J 50/20; H02J 50/80
See application file for complete search history.

(56) References Cited

U.S. PATENT DOCUMENTS

| | | | |
|---|---|---|---|
| 2010/0033021 A1 | 2/2010 | Bennett | |
| 2010/0079008 A1* | 4/2010 | Hyde | H02J 50/80 250/201.1 |
| 2012/0214536 A1* | 8/2012 | Kim | H02J 50/20 455/522 |
| 2012/0326660 A1 | 12/2012 | Lu et al. | |
| 2017/0110889 A1* | 4/2017 | Bell | H04L 43/022 |
| 2017/0110909 A1 | 4/2017 | Zeine et al. | |
| 2017/0331331 A1 | 11/2017 | Zeine et al. | |
| 2019/0140487 A1 | 5/2019 | Zeine et al. | |

FOREIGN PATENT DOCUMENTS

| | | | |
|---|---|---|---|
| WO | 2018/208130 | 11/2018 | |
| WO | WO-2018208130 A1 * | 11/2018 | H02J 50/30 |

OTHER PUBLICATIONS

Samuel A. Rotenberg et al., An Efficient Rectifier for an RDA Wireless Power Transmission System Operating at 2.4GHz, (32nd URSI GASS) Aug. 19-26, 2017, Montreal, Canada.
U.S. Appl. No. 15/852,348, filed Dec. 22, 2017, Zeine et al., not yet published.

* cited by examiner

*Primary Examiner* — Rexford N Barnie
*Assistant Examiner* — Joseph N Inge
(74) *Attorney, Agent, or Firm* — Volpe Koenig

(57) ABSTRACT

The embodiments described herein comprise a distributed wireless power transmission system including a plurality of wireless power transmission systems (WPTSs) coordinating transmissions to create a virtual WPTS. The plurality of WPTS coordinate amongst each other to compensate for local phase shift differences between respective clock sources so that transmissions from the WPTSs constructively interfere at a wireless power receiver client (WPRC).

20 Claims, 10 Drawing Sheets

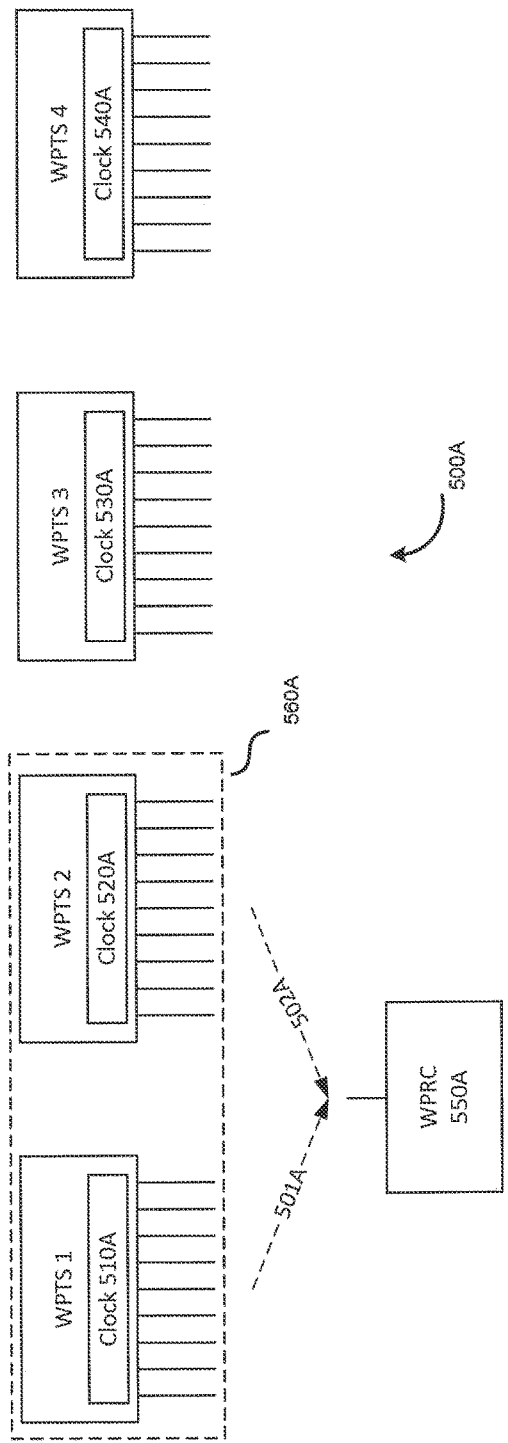
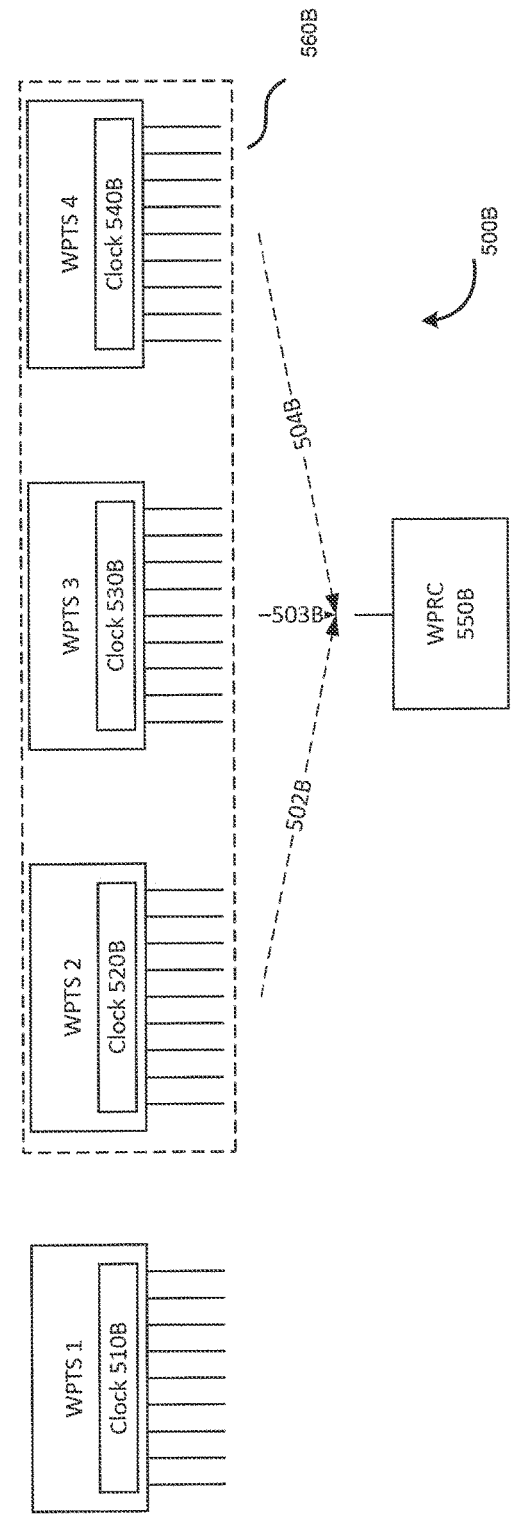
FIGURE 5A
FIGURE 5B

DISTRIBUTED WIRELESS POWER TRANSMISSION SYSTEM

CROSS-REFERENCE TO RELATED APPLICATION(S)

This application is a continuation of U.S. patent application Ser. No. 16/205,332, filed Nov. 30, 2018, the entirety of which is incorporated herein by this reference, and is also related to International Patent Application PCT/US19/63156, filed Nov. 26, 2019, which published as WO 2020/112711 on Jun. 4, 2020.

FIELD OF INVENTION

The embodiments described herein comprise a distributed wireless power transmission system including a plurality of wireless power transmission systems (WPTSs) coordinating transmissions to create a virtual WPTS.

BACKGROUND

For a wireless power delivery system including a plurality of wireless power transmission systems (WPTSs), a single WPTS can deliver power to a wireless power receiver client (WPRC) as the WPRC moves around within its proximity. Once the WPRC leaves the first WPTS's vicinity, it must then receive power from a new WPTS. Disruptions in wireless power delivery can occur as the WPRC moves from one WPTS to the next WPTS.

A WPRC may also be located such that it is within the vicinity of multiple WPTSs. In this situation, only a single WPTS may be able to deliver wireless power to the WPRC. Alternatively, if multiple WPTSs are able to deliver power to the WPRC, but they are not synchronized across the multiple WPTSs, the wireless power signals from each can destructively interfere with each other, which would result in less power delivery than if just a single WPTS wirelessly transmitted power. However, if the multiple WPTSs were able to synchronize their transmissions such that the wireless power they transmitted constructively interfered at the WPRC, they would be able to form a virtual WPTS and deliver significantly more power to the WPRC. Thus, a need exists for establishing a virtual WPTS comprising multiple individual WPTSs that transmit power in synchronization to a WPRC.

SUMMARY

Disclosed herein are methods and apparatuses for implementing coordinated wireless power transmission from multiple wireless power transmission systems (WPTSs). An example embodiment includes receiving an instruction to group with one or more WPTSs to collaborate to transmit wireless power to a wireless power receiver client (WPRC). The embodiment may further include receiving an indication of a clock adjusting a phase offset of a local oscillator based on the indication of the clock. The embodiment may further include providing wireless power to the WPRC in collaboration with the one or more WPTSs, wherein the wireless power is transmitted based on the adjusted phase offset.

Another embodiment may further include forming a virtual WPTS with the one or more WPTSs. The forming may be based on a location of the WPRC. The embodiment may further include receiving an instruction to disband the virtual WPTS on a condition that the WPRC has moved away from at least one of the WPTSs of the one or more WPTSs.

In yet another embodiment, the indication of a clock may indicate a clock from a plurality of clock sources to use as a common clock. In one example, the indication of a clock may indicate a central controller board clock source.

In yet another embodiment, the WPTS may be a slave WPTS and the instruction may be received from an elected master WPTS. In one example, the WPTS and the one or more WPTSs may be calibrated with one another to align transmissions based on respective clocks. In another example, the wireless power provided by the WPRC may substantially constructively interfere at the WPRC with wireless power transmitted by the one or more WPTSs. In yet another example, the received indication of the clock may be based on a power received at a calibration unit.

BRIEF DESCRIPTION OF THE DRAWINGS

FIGS. 5A and 5B are diagrams of an example system of multiple wireless power transmission systems (WPTSs) and a wireless power receiver client (WPRC).

DETAILED DESCRIPTION OF THE PREFERRED EMBODIMENTS

Figure 1:
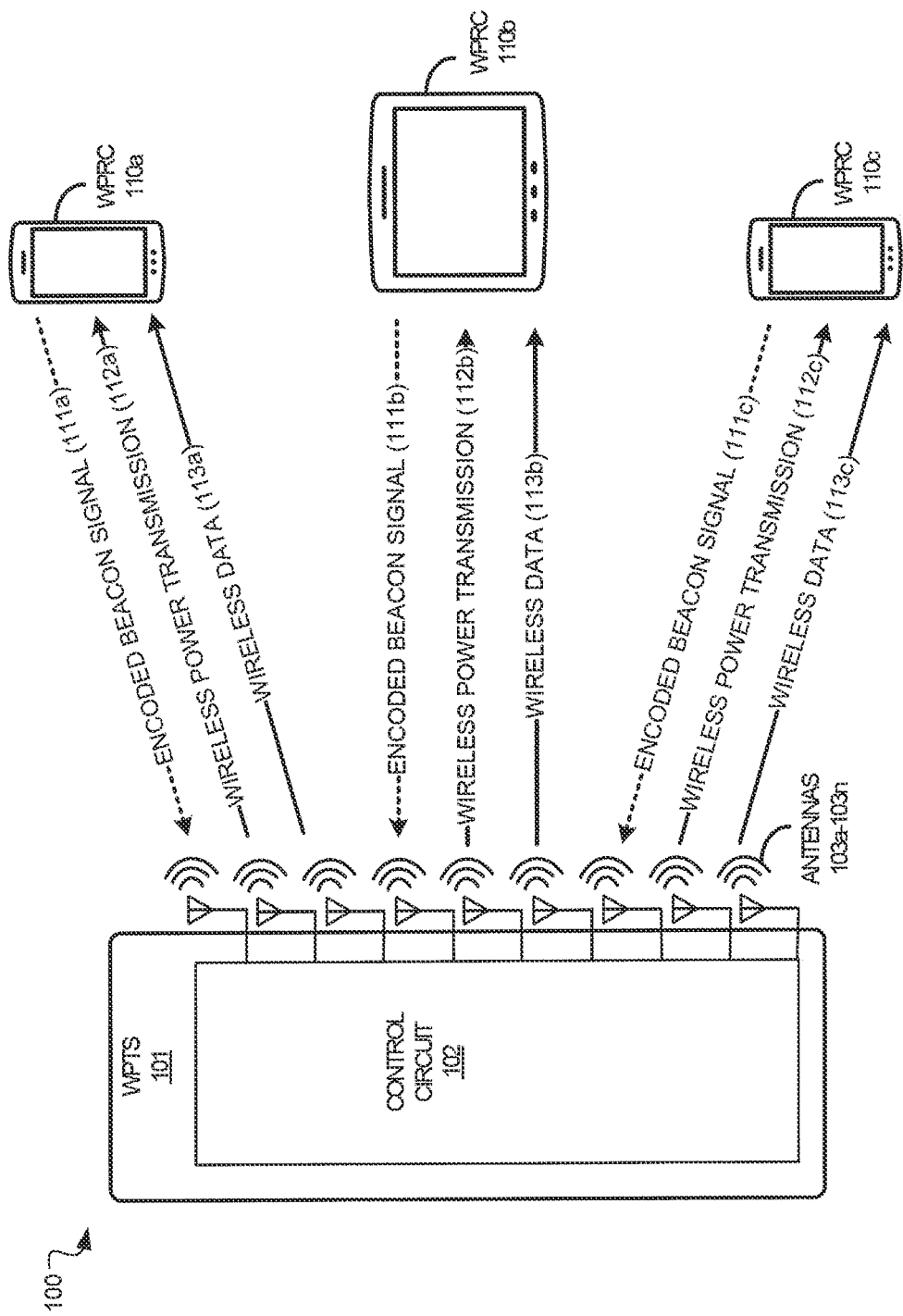
FIG. 1 depicts a system diagram including an example wireless power transmission environment.

FIG. 1 depicts a system diagram including an example wireless power transmission environment 100 illustrating wireless power delivery from one or more wireless power transmission systems (WPTSs), such as WPTS 101. More specifically, FIG. 1 illustrates power transmission to one or more wireless power receiver clients (WPRCs) 110a-110c. WPTS 101 may be configured to receive encoded beacons 111a-111c from and transmit wireless power 112a-112c and wireless data 113a-113c to WPRCs 110a-110c. WPRCs 110a-110c may be configured to receive and process wireless power 112a-112c from one or more WPTSs, such as WPTS 101. Components of an example WPTS 101 are shown and discussed in greater detail below, as well as in FIG. 2. Components of an example WPRC 110a-110c are shown and discussed in greater detail with reference to FIG. 3.

WPTS 101 may include multiple antennas 103a-103n, e.g., an antenna array including a plurality of antennas, which may be capable of delivering wireless power 112a-

112c to WPRCs 110a-110c. In some embodiments, the antennas are adaptively-phased radio frequency (RF) antennas. The WPTS 101 may be capable of determining the appropriate phases with which to deliver a coherent power transmission signal to WPRCs 110a-110c. Each antenna of the antenna array including antennas 103a-103n may be configured to emit a signal, e.g. a continuous wave or pulsed power transmission signal, at a specific phase relative to each other antenna, such that a coherent sum of the signals transmitted from a collection of the antennas is focused at a location of a respective WPRC 110a-110c. Although FIG. 1 depicts wireless signals including encoded beacon signals 111a-111c, wireless power transmission 112a-112c, and wireless data 113a-113c each being transmitted by or received by a single antenna of the antennas 103a-103n of the WPTS 101, this should not be construed as limiting in any way. Any number of antennas may be employed in the reception and transmission of signals. Multiple antennas, including a portion of antennas 103a-103n that may include all of antennas 103a-103n, may be employed in the transmission and/or reception of wireless signals. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital circuits and modems.

As illustrated in the example of FIG. 1, antennas 103a-103n may be included in WPTS 101 and may be configured to transmit both power and data and to receive data. The antennas 103a-103n may be configured to provide delivery of wireless radio frequency power in a wireless power transmission environment 100, to provide data transmission, and to receive wireless data transmitted by WPRCs 110a-110c, including encoded beacon signals 111a-111c. In some embodiments, the data transmission may be through lower power signaling than the wireless radio frequency power transmission. In some embodiments, one or more of the antennas 103a-103n may be alternatively configured for data communications in lieu of wireless power delivery. In some embodiments, one or more of the power delivery antennas 103a-103n can alternatively or additionally be configured for data communications in addition to or in lieu of wireless power delivery. The one or more data communication antennas are configured to send data communications to and receive data communications from WPRCs 110a-110c.

Each of WPRCs 110a-110c may include one or more antennas (not shown) for transmitting signals to and receiving signals from WPTS 101. Likewise, WPTS 101 may include an antenna array having one or more antennas and/or sets of antennas, each antenna or set of antennas being capable of emitting continuous wave or discrete (pulse) signals at specific phases relative to each other antenna or set of antennas. As discussed above, WPTSs 101 is capable of determining the appropriate phases for delivering the coherent signals to the antennas 103a-103n. For example, in some embodiments, delivering coherent signals to a particular WPRC can be determined by computing the complex conjugate of a received encoded beacon signal at each antenna of the array or each antenna of a portion of the array such that a signal from each antenna is phased appropriately relative to a signal from other antennas employed in delivering power or data to the particular WPRC that transmitted the beacon signal. The WPTS 101 can be configured to emit a signal (e.g., continuous wave or pulsed transmission signal) from multiple antennas using multiple waveguides at a specific phase relative to each other. Other techniques for delivering a coherent wireless power signal are also applicable such as, for example, the techniques discussed in U.S. patent application Ser. No. 15/852,216 titled "Anytime Beaconing In A WPTS" filed Dec. 22, 2017 and in U.S. patent application Ser. No. 15/852,348 titled "Transmission Path Identification based on Propagation Channel Diversity" filed Dec. 22, 2017; which are expressly incorporated by reference herein.

Although not illustrated, each component of the wireless power transmission environment 100, e.g., WPRCs 110a-110c, WPTS 101, can include control and synchronization mechanisms, e.g., a data communication synchronization module. WPTS 101 can be connected to a power source such as, for example, a power outlet or source connecting the WPTSs to a standard or primary alternating current (AC) power supply in a building. Alternatively, or additionally, WPTS 101 can be powered by a battery or via other mechanisms, e.g., solar cells, etc.

As shown in the example of FIG. 1, WPRCs 110a-110c include mobile phone devices and a wireless tablet. However, WPRCs 110a-110c can be any device or system that needs power and is capable of receiving wireless power via one or more integrated WPRCs. Although three WPRCs 110a-110c are depicted, any number of WPRCs may be supported. As discussed herein, a WPRC may include one or more integrated power receivers configured to receive and process power from one or more WPTSs and provide the power to the WPRCs 110a-110c or to internal batteries of the WPRCs 110a-110c for operation thereof.

As described herein, each of the WPRCs 110a-110c can be any system and/or device, and/or any combination of devices/systems that can establish a connection with another device, a server and/or other systems within the example wireless power transmission environment 100. In some embodiments, the WPRCs 110a-110c may each include displays or other output functionalities to present or transmit data to a user and/or input functionalities to receive data from the user. By way of example, WPRC 110a can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, WPRC 110a can also be any wearable device such as watches, necklaces, rings or even devices embedded on or within the customer. Other examples of WPRC 110a include, but are not limited to, a safety sensor, e.g. a fire or carbon monoxide sensor, an electric toothbrush, an electronic door lock/handle, an electric light switch controller, an electric shaver, an electronic shelf label (ESL), etc.

Although not illustrated in the example of FIG. 1, the WPTS 101 and the WPRCs 110a-110c can each include a data communication module for communication via a data channel. Alternatively, or additionally, the WPRCs 110a-110c can direct antennas to communicate with WPTS 101 via existing data communications modules. In some embodiments, the WPTS 101 can have an embedded Wi-Fi hub for data communications via one or more antennas or transceivers. In some embodiments, the antennas 103a-103n can communicate via Bluetooth™, Wi-Fi™, ZigBee™, etc. The WPRCs 110a-110c may also include an embedded Bluetooth™, Wi-Fi™, ZigBee™, etc. transceiver for communicating with the WPTS 101. Other data communication protocols are also possible. In some embodiments the beacon signal, which is primarily referred to herein as a continuous waveform, can alternatively or additionally take the form of a modulated signal and/or a discrete/pulsed signal.

WPTS 101 may also include control circuit 102. Control circuit 102 may be configured to provide control and intelligence to the WPTS 101 components. Control circuit 102 may comprise one or more processors, memory units, etc., and may direct and control the various data and power communications. Control circuit 102 may direct data communications on a data carrier frequency that may be the same or different than the frequency via which wireless power is delivered. Likewise, control circuit 102 can direct wireless transmission system 100 to communicate with WPRCs 110a-110c as discussed herein. The data communications can be, by way of example and not limitation, Bluetooth™, Wi-Fi™, ZigBee™, etc. Other communication protocols are possible.

It is appreciated that the use of the term "WPTS" does not necessarily limit the WPTS to any specific structure. That is, the WPTS does not need to be structured in a specific form or geometry. Furthermore, as used herein the term "transmission system" or "WPTS" may be used to include related and peripheral circuitry for signal generation, reception and transmission, such as radios, digital circuits and modems.

Figure 2:
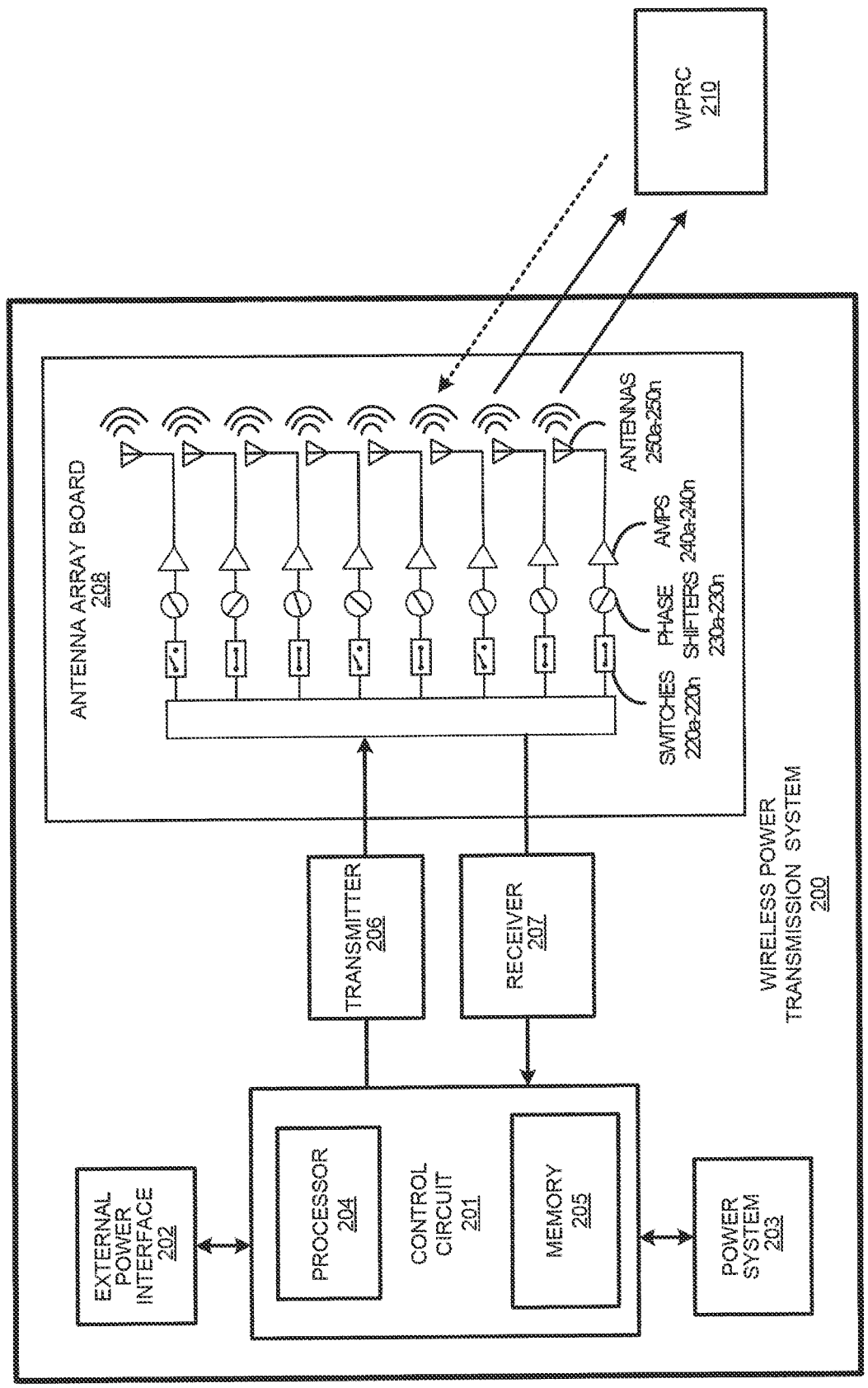
FIG. 2 is a block diagram illustrating example components of an example embodiment of a wireless power transmission system (WPTS).

FIG. 2 is a block diagram illustrating example components of a WPTS 200 in accordance with the embodiments described herein. As illustrated in the example of FIG. 2, the WPTS 200 may include a control circuit 201, external power interface 202, and power system 203. Control circuit 201 may include processor 204, for example a base band processor, and memory 205. Additionally, although only one antenna array board 208 and one transmitter 206 are depicted in FIG. 2, WPTS 200 may include one or more transmitters 206 coupled to one or more antenna array boards 208 and transmit signals to the one or more antenna array boards 208. Although only one receiver is depicted in FIG. 2, one or more receivers 207 may be coupled to the one or more antenna array boards 208 and may receive signals from the one or more antennas 250a-250n of the one or more antenna array boards 208. Each antenna array board 208 includes switches 220a-220n, phase shifters 230a-230n, power amplifiers 240a-240n, and antenna arrays 250a-250n. Although each switch, phase shifter, power amplifier, and antenna is depicted in a one-to-one relationship, this should not be construed as limiting. Additionally or alternatively, any number of switches, phase shifters, power amplifiers, and antennas may be coupled. Some or all of the components of the WPTS 200 can be omitted, combined, or sub-divided in some embodiments. Furthermore, the setting of the switches 220a-220n and phase shifters 230a-230n should not be construed as limiting. Any of the switches 220a-220n, phase shifters 230a-230n, and/or power amplifiers 240a-240n, or any combination thereof, may be individually controlled or controlled in groups. The signals transmitted and received by the one or more antenna array boards 208 may be wireless power signals, wireless data signals, or both.

Control circuit 201 is configured to provide control and intelligence to the array components including the switches 220a-220n, phase shifters 230a-230n, power amplifiers 240a-240n, and antenna arrays 250a-250n. Control circuit 201 may direct and control the various data and power communications. Transmitter 206 can generate a signal comprising power or data communications on a carrier frequency. The signal can be comply with a standardized format such as Bluetooth™, Wi-Fi™, ZigBee™, etc., including combinations or variations thereof. Additionally or alternatively, the signal can be a proprietary format that does not use Bluetooth™ Wi-Fi™, ZigBee™, and the like, and utilizes the same switches 220a-220n, phase shifters 230a-230n, power amplifiers 240a-240n, and antenna arrays 250a-250n to transmit wireless data as are used to transmit wireless power. Such a configuration may save on hardware complexity and conserve power by operating independently of the constraints imposed by compliance with the aforementioned standardized formats. In some embodiments, control circuit 201 can also determine a transmission configuration comprising a directional transmission through the control of the switches 220a-220n, phase shifters 230a-230n, and amplifiers 240a-240n based on an encoded beacon signal received from a WPRC 210.

The external power interface 202 is configured to receive external power and provide the power to various components. In some embodiments, the external power interface 202 may be configured to receive, for example, a standard external 24 Volt power supply. In other embodiments, the external power interface 202 can be, for example, 120/240 Volt AC mains to an embedded DC power supply which may source, for example, 12/24/48 Volt DC to provide the power to various components. Alternatively, the external power interface could be a DC supply which may source, for example, 12/24/48 Volts DC. Alternative configurations including other voltages are also possible.

Switches 220a-220n may be activated to transmit power and/or data and receive encoded beacon signals based on the state of the switches 220a-220n. In one example, switches 220a-220n may be activated, e.g. closed, or deactivated, e.g. open, for power transmission, data transmission, and/or encoded beacon reception. Additional components are also possible. For example, in some embodiments phase-shifters 230a-230n may be included to change the phase of a signal when transmitting power or data to a WPRC 210. Phase shifter 230a-230n may transmit a power or data signal to WPRC 210 based on a phase of a complex conjugate of the encoded beaconing signal from WPRC 210. The phase-shift may also be determined by processing the encoded beaconing signal received from WPRC 210 and identifying WPRC 210. WPTS 200 may then determine a phase-shift associated with WPRC 210 to transmit the power signal. In an example embodiment, data transmitted from the WPTS 200 may be in the form of communication beacons which may be used to synchronize clocks with WPRC 210. This synchronization may improve the reliability of beacon phase detection.

In operation, control circuit 201, which may control the WPTS 200, may receive power from a power source over external power interface 202 and may be activated. Control circuit 201 may identify an available WPRC 210 within range of the WPTS 200 by receiving an encoded beacon signal initiated by the WPRC 210 via at least a portion of antennas 250a-250n. When the WPRC 210 is identified based on the encoded beacon signal, a set of antenna elements on the WPTS may power on, enumerate, and calibrate for wireless power and/or data transmission. At this point, control circuit 201 may also be able to simultaneously receive additional encoded beacon signals from other WPRCs via at least a portion of antennas 250a-250n.

Once the transmission configuration has been generated and instructions have been received from control circuit 201, transmitter 206 may generate and transfer one or more power and/or data signal waves to one or more antenna boards 208. Based on the instruction and generated signals, at least a portion of power switches 220a-220n may be opened or closed and at least a portion of phase shifters 230a-230n may be set to the appropriate phase associated with the transmission configuration. The power and/or data signal may then be amplified by at least a portion of power amplifiers 240a-240n and transmitted at an angle directed toward a location of WPRC 210. As discussed herein, at least a portion of antennas 250a-250n may be simultaneously receiving encoded beacon signals from additional WPRCs 210.

As described above, a WPTS 200 may include one or more antenna array boards 208. In one embodiment, each antenna array board 208 may be configured to communicate with a single WPRC 210, so that a different antenna array board 208 of a plurality of antenna array boards 208 communicates with a different WPRC 210 of a plurality of WPRCs 210. Such an implementation may remove a reliance on a communication method, such as a low-rate personal area network (LR-WPAN), IEEE 802.15.4, or Bluetooth Low Energy (BLE) connection to synchronize with a WPRC 210. A WPTS 200 may receive a same message from a WPRC 210 via different antennas of antennas 250a-250n. The WPTS 200 may use the replication of the same message across the different antennas to establish a more reliable communication link. In such a scenario, a beacon power may be lowered since the lower power can be compensated by the improved reliability owed to the replicated received signals. In some embodiments, it may also be possible to dedicate certain antennas or groups of antennas for data communication and dedicate other antennas or groups of antennas for power delivery. For example, an example WPTS 200 may dedicate 8 or 16 antennas of antennas 250a-250n to data communication at a lower power level than some number of remaining antennas that may be dedicated to power delivery at a relatively higher power level than the data communication.

Figure 3:
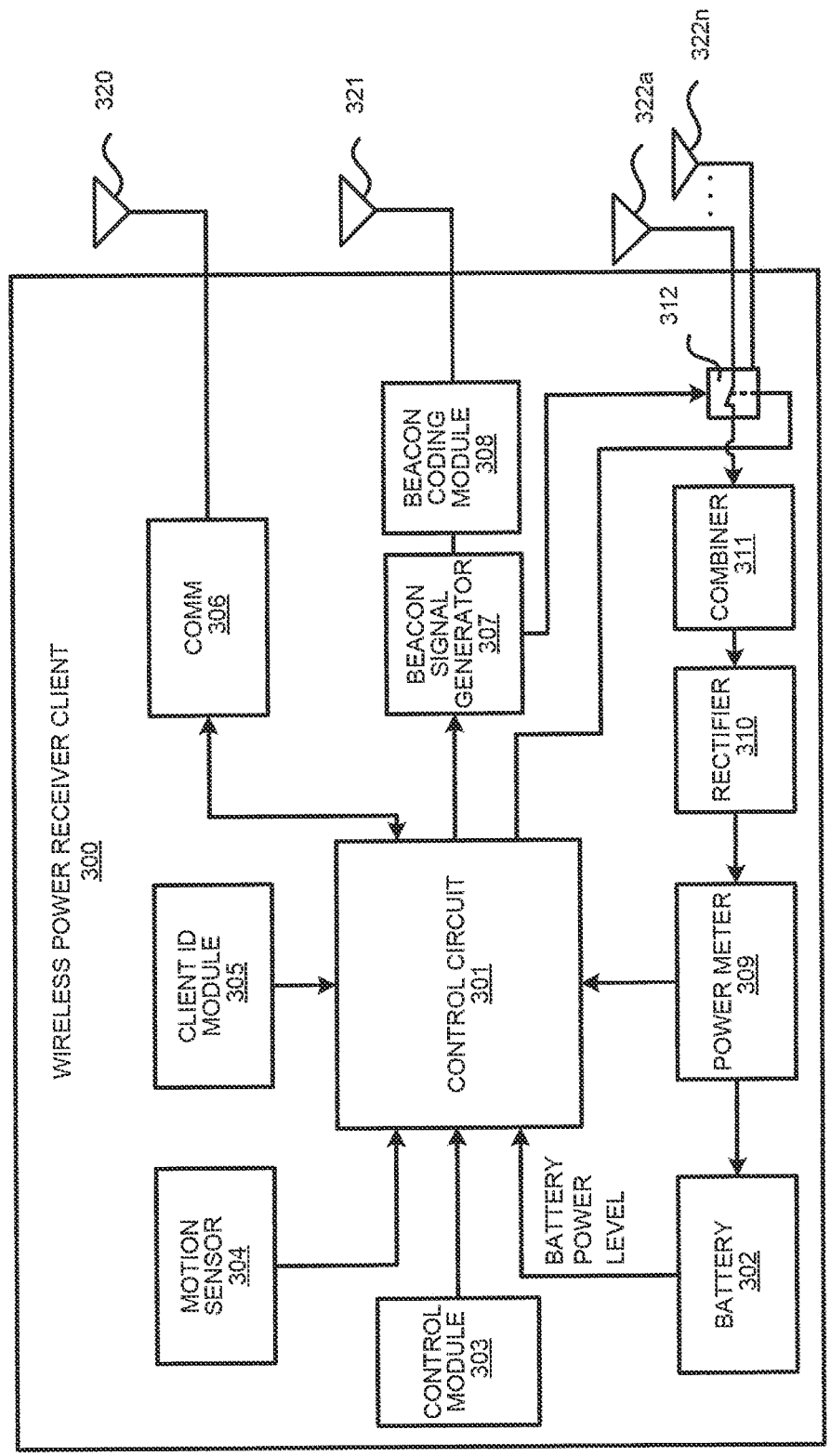
FIG. 3 is a block diagram illustrating an example embodiment of a WPRC.

FIG. 3 is a block diagram illustrating an example WPRC 300 in accordance with embodiments described herein. As shown in the example of FIG. 3, WPRC 300 may include control circuit 301, battery 302, a control module 303, for example an Internet of Things (IoT) control module, communication block 306 and associated one or more antennas 320, power meter 309, rectifier 310, a combiner 311, beacon signal generator 307, beacon coding unit 308 and associated one or more antennas 321, and switch 312 connecting the combiner 311 or the beacon signal generator 307 to one or more associated antennas 322a-322n. The battery 302 may alternatively be replaced by a capacitor. Although not depicted, the WPRC 300 may include an energy harvesting circuit which may enable the WPRC 300 to operate with a capacitor for short term energy storage instead of or in addition to using the battery. Some or all of the depicted components in FIG. 3 can be omitted, combined, or subdivided in some embodiments. Some or all of the components depicted in FIG. 3 may be incorporated in a single integrated chip (IC). It should be noted that although the WPTS 200 may use full-duplexing, WPRC 300 may additionally or alternatively use half-duplexing. A received and/or transmitted data rate may be, for example, 20 Mbps. However, higher or lower data rates may be implemented to achieve other design goals. The WPRC 300 may transmit acknowledgement (ACK) messages back to a WPTS, such as a WPTS 200 depicted in FIG. 2. Although not depicted, a local CPU may be incorporated into WPRC 300. For example, the local CPU may be included in the control circuit 301.

A combiner 311 may receive and combine the received power and/or data transmission signals received via one or more antennas 322a-322n. The combiner can be any combiner or divider circuit that is configured to achieve isolation between output ports while maintaining a matched condition. For example, the combiner 311 can be a Wilkinson Power Divider circuit. The combiner 311 may be used to combine two or more RF signals while maintaining a characteristic impedance, for example, 50 ohms. The combiner 311 may be a resistive-type combiner, which uses resistors, or a hybrid-type combiner, which uses transformers. The rectifier 310 may receive the combined power transmission signal from the combiner 311, if present, which may be fed through the power meter 309 to the battery 302 for charging. In other embodiments, each antenna's power path can have its own rectifier 310 and the DC power out of the rectifiers is combined prior to feeding the power meter 309. The power meter 309 may measure the received power signal strength and may provide the control circuit 301 with this measurement.

Battery 302 may include protection circuitry and/or monitoring functions. Additionally, the battery 302 may include one or more features, including, but not limited to, current limiting, temperature protection, over/under voltage alerts and protection, and battery capacity monitoring, for example coulomb monitoring. The control circuit 301 may receive the battery power level from the battery 302 itself. As indicated above, although not shown, a capacitor may be substituted for the battery 302 or may be implemented in addition to the battery 302. The control circuit 301 may also transmit/receive via the communication block 306 a data signal on a data carrier frequency, such as the base signal clock for clock synchronization. The beacon signal generator 307 may generate the beacon signal or calibration signal and may transmit the beacon signal or calibration signal using one or more antennas 321.

It may be noted that, although the battery 302 is shown as charged by, and providing power to, WPRC 300, the receiver may also receive its power directly from the rectifier 310. This may be in addition to the rectifier 310 providing charging current to the battery 302, or in lieu of providing charging. Also, it may be noted that the use of multiple antennas 320, 321, and 322a-322n is one example of implementation, however the structure may be reduced to one shared antenna.

In some embodiments, the control circuit 301 and/or the control module 303 can communicate with and/or otherwise derive device information from WPRC 300. The device information can include, but is not limited to, information about the capabilities of the WPRC 300, usage information of the WPRC 300, power levels of the battery or batteries 302 of the WPRC 300, and/or information obtained or inferred by the WPRC 300. In some embodiments, a client identifier (ID) module 305 stores a client ID that can uniquely identify the WPRC 300 in a wireless power delivery environment. For example, the ID can be transmitted to one or more WPTSs in the encoded beacon signal. In some embodiments, WPRCs may also be able to receive and identify other WPRCs in a wireless power delivery environment based on the client ID.

A motion sensor 304 can detect motion and may signal the control circuit 301 to act accordingly. For example, a device receiving power may integrate motion detection mechanisms such as accelerometers or equivalent mechanisms to detect motion. Once the device detects that it is in motion, it may be assumed that it is being handled by a user, and may trigger a signal to the antenna array of the WPTS to either stop transmitting power and/or data, or to initiate wireless power and/or data transmission from the WPTS. The WPRC may use the encoded beacon or other signaling to communicate with the WPTS. In some embodiments, when a WPRC 300 is used in a moving environment like a car, train or plane, the power might only be transmitted intermittently or at a reduced level unless the WPRC 300 is critically low on power.

Figure 4:
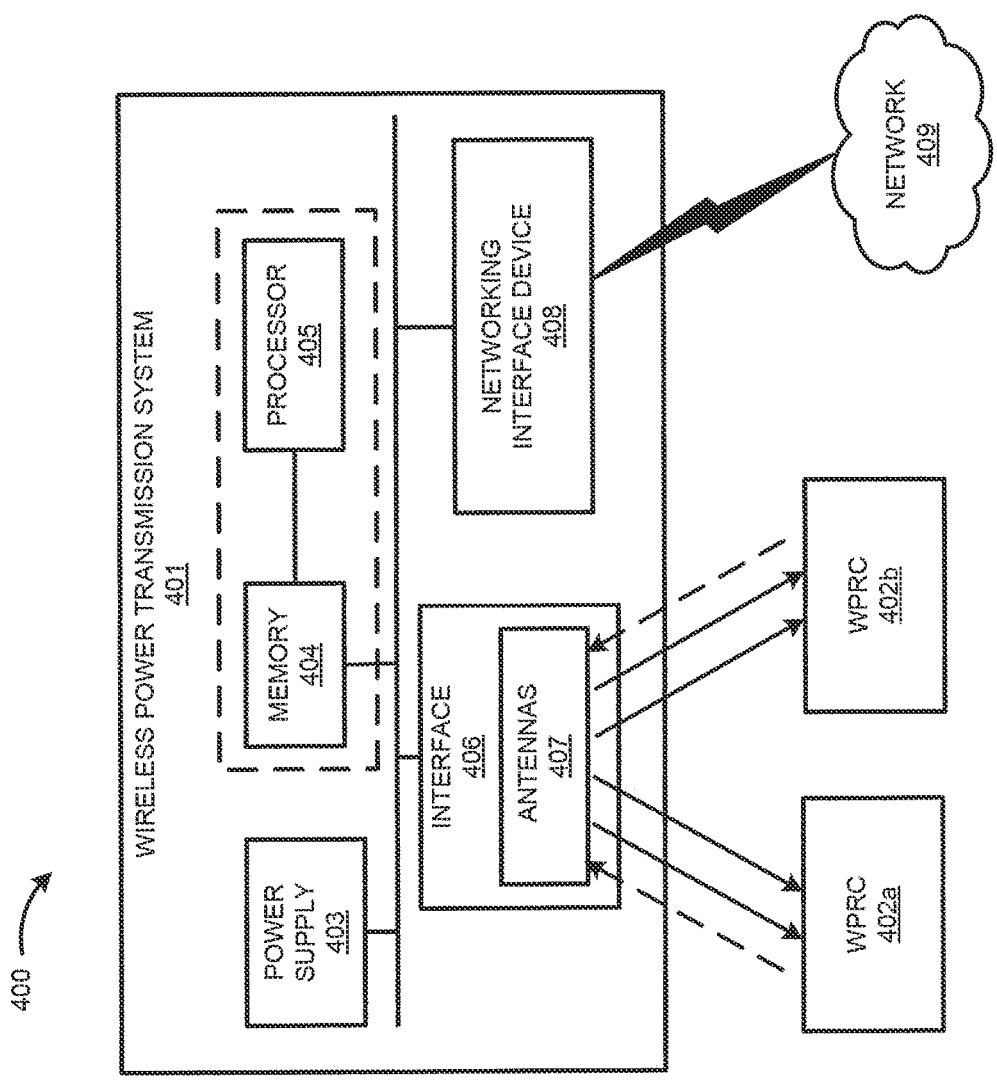
FIG. 4 is a diagram illustrating an example embodiment of a wireless signal delivery environment.

FIG. 4 is a diagram illustrating an example wireless signal delivery environment 400 in accordance with embodiments described herein. The wireless signal delivery environment 400 includes WPTS 401, a user operating WPRCs 402a and 402b, and wireless network 409. Although two WPRCs are depicted in FIG. 4, any number of WPRCs may be supported. WPTS 401 as depicted in FIG. 4 can alternatively be implemented in accordance with WPTS 101 as depicted in FIG. 1. Alternative configurations are also possible. Likewise, WPRCs 402a and 402b as depicted in FIG. 4 can be implemented in accordance with WPRCs 110a-110c of FIG. 1, or can be implemented in accordance with WPRC 300 as depicted in FIG. 3, although alternative configurations are also possible.

WPTS 401 may include a power supply 403, memory 404, processor 405, interface 406, one or more antennas 407, and a networking interface device 408. Some or all of the components of the WPTS 401 can be omitted, combined, or sub-divided in some embodiments. The networking interface device may communicate wired or wirelessly with a network 409 to exchange information that may ultimately be communicated to or from WPRCs 402a and 402b. The one or more antennas 407 may also include one or more receivers, transmitters, and/or transceivers. The one or more antennas 407 may have a radiation and reception pattern directed in a space proximate to WPRC 402a, WPRC 402b, or both, as appropriate. WPTS 401 may transmit a wireless power signal, wireless data signal, or both over at least a portion of antennas 407 to WPRCs 402a and 402b. As discussed herein, WPTS 401 may transmit the wireless power signal, wireless data signal, or both at an angle in the direction of WPRCs 402a and 402b such that the strength of the respectively received wireless signal by WPRCs 402a and 402b depends on the accuracy of the directivity of the corresponding directed transmission beams from at least a portion of antennas 407.

A fundamental property of antennas is that the receiving pattern of an antenna when used for receiving is directly related to the far-field radiation pattern of the antenna when used for transmitting. This is a consequence of the reciprocity theorem in electromagnetics. The radiation pattern can be any number of shapes and strengths depending on the directivity of the beam created by the waveform characteristics and the types of antennas used in the antenna design of the antennas 407. The types of antennas 407 may include, for example, horn antennas, simple vertical antenna, etc. The antenna radiation pattern can comprise any number of different antenna radiation patterns, including various directive patterns, in a wireless signal delivery environment 400. By way of example and not limitation, wireless power transmit characteristics can include phase settings for each antenna and/or transceiver, transmission power settings for each antenna and/or transceiver, or any combination of groups of antennas and transceivers, etc.

As described herein, the WPTS 401 may determine wireless communication transmit characteristics such that, once the antennas and/or transceivers are configured, the multiple antennas and/or transceivers are operable to transmit a wireless power signal and/or wireless data signal that matches the WPRC radiation pattern in the space proximate to the WPRC. Advantageously, as discussed herein, the wireless signal, including a power signal, data signal, or both, may be adjusted to more accurately direct the beam of the wireless signal toward a location of a respective WPRC, such as WPRCs 402a and 402b as depicted in FIG. 4.

The directivity of the radiation pattern shown in the example of FIG. 4 is illustrated for simplicity. It is appreciated that any number of paths can be utilized for transmitting the wireless signal to WPRCs 402a and 402b depending on, among other factors, reflective and absorptive objects in the wireless communication delivery environment. FIG. 4 depicts direct signal paths, however other signal paths, including multi-path signals, that are not direct are also possible.

The positioning and repositioning of WPRCs 402a and 402b in the wireless communication delivery environment may be tracked by WPTS 401 using a three-dimensional angle of incidence of an RF signal at any polarity paired with a distance that may be determined by using an RF signal strength or any other method. As discussed herein, an array of antennas 407 capable of measuring phase may be used to detect a wave-front angle of incidence. A respective angle of direction toward WPRCs 402a and 402b may be determined based on respective distance to WPRCs 402a and 402b and on respective power calculations. Alternatively, or additionally, the respective angle of direction to WPRCs 402a and 402b can be determined from multiple antenna array segments 407.

In some embodiments, the degree of accuracy in determining the respective angle of direction toward WPRCs 402a and 402b may depend on the size and number of antennas 407, number of phase steps, method of phase detection, accuracy of distance measurement method, RF noise level in environment, etc. In some embodiments, users may be asked to agree to a privacy policy defined by an administrator for tracking their location and movements within the environment. Furthermore, in some embodiments, the system can use the location information to modify the flow of information between devices and optimize the environment. Additionally, the system can track historical wireless device location information and develop movement pattern information, profile information, and preference information.

Disclosed herein are embodiments of a system and method for coordinating multiple WPTSs to act as a single, virtual WPTS to provide wireless power to one or more WPRCs. Such a virtual WPTS may exhibit a larger virtual aperture than any single WPTS. By coordinating transmissions from multiple WPTSs, a virtual WPTS can be dynamically formed from an optimal selection of WPTSs to wirelessly transmit power to a WPRC in a coordinated fashion such that their respective transmissions constructively interfere at a location of the WPRC to deliver significantly greater power than any single WPTS and significantly greater power than the same collection of WPTSs without having coordinated transmissions.

FIG. 5A is a diagram depicting an example system 500A of four WPTSs 1-4 and a single WPRC 550A. As depicted in FIG. 5A, WPRC 550A may be located proximate to WPTS 1 and WPTS 2. Based on a determined location of WPRC 550A, WPTS 1 and WPTS 2 may be selected to be grouped as a virtual WPTS 560A to transmit wireless power to WPRC 550A. For example, WPRC 550A may transmit a beacon that is received by WPTS 1 and WPTS 2 and may not be received or weakly received by WPTS 3 and WPTS 4. Alternatively, WPTS 3 and WPTS 4 may not be selected based on reasons that are not location based. For example, WPTS 3 and WPTS 4 may be heavily loaded with other wireless power demands and at least based on their load they may be excluded from the virtual WPTS 560A. Location of the WPRC influencing how WPTSs group together is meant to be exemplary only. Any examples of a reason for joining a group of WPTSs and excluding other WPTSs is not meant to be limiting. Any number of reasons may cause a plurality of WPTSs to group together to form a virtual WPTS.

WPTS 1 and WPTS 2 may share a common clock to adjust respective phase of their transmissions so that the phases of their wireless power transmissions align at the location of the WPRC 550A and hence their transmissions constructively interfere at the WPRC 550A. As depicted in FIG. 5A, each of WPTS 1 and WPTS 2 may include a clock source 510A and 520A, respectively. Either clock source may be used as the common clock source and shared with the other WPTS. Alternatively, although not shown, WPTS 1 and WPTS 2 may be controlled by a central controller board (CCB) which may include a clock source that is shared with WPTS 1 and WPTS 2 to coordinate their transmissions. Once phases of WPTS 1 and/or WPTS 2 are properly adjusted with respect to each other, wireless power 501A from WPTS 1 and wireless power 502A from WPTS 2 may be delivered to WPRC 550A.

FIG. 5B is a diagram depicting an example system 500B of four WPTSs 1-4 and a single WPRC 550B. As depicted in FIG. 5B, WPRC 550B may have moved from its location depicted in FIG. 5A such that it is now located proximate to WPTS 2, WPTS 3 and WPTS 4. As WPRC 550B moved away from WPTS 560A depicted in FIG. 5A, virtual WPTS 560A may be disbanded as it may no longer be optimal for providing wireless power to WPRC 550B. Again, by way of example, a determined location of WPTS 550B may be used for making a determination to disband. Similarly, using a determined location of WPTS 550B, WPTS 2, WPTS 3, and WPTS 4 may be selected to be grouped as a virtual WPTS 560B to transmit wireless power to WPRC 550B. By way of example, WPRC 550B may transmit a beacon that is received by WPTS 2, WPTS 3, and WPTS 4 and may not be received or weakly received by WPTS 1. Alternatively, WPTS 1 may not be selected based on reasons that are not location based. For example, WPTS 1 may be heavily loaded with other wireless power demands and at least based on its load it may be excluded from the virtual WPTS 560B.

WPTS 2, WPTS 3, and WPTS 4 may share a common clock to adjust respective phases of their transmissions so that the phases of their wireless power transmissions align at the location of the WPRC 550B so that their transmissions constructively interfere at the WPRC 550B. As depicted in FIG. 5B, each of WPTS 2, WPTS 3, and WPTS 4 may include a clock source 520B, 530B, and 540B, respectively. Any of said clock sources may be used as the common clock source and shared with the other WPTSs. Alternatively, although not shown, WPTS 2, WPTS 3, and WPTS 4 may be controlled by a CCB which may include a clock source that is shared with WPTS 2, WPTS 3, and WPTS 4 to coordinate their transmissions. Once phases of WPTS 2, WPTS 3, and/or WPTS 4 are properly adjusted with respect to each other, wireless power 502B from WPTS 2, wireless power 503B from WPTS 3, and wireless power 504B from WPTS 4 may be delivered to WPRC 550B.

Although FIGS. 5A and 5B depict an example system in two dimensions, it should be understood that a system of WPTSs may be arranged in three dimensions and a WPRC may move in three dimensions. Like the depictions in FIGS. 5A and 5B, appropriate WPTSs may be dynamically selected and deselected to form and disband virtual WPTSs in three dimensional space to provide wireless power to a WPRC as it moves in three dimensions. Furthermore, the number of WPTSs is purely by way of example. More or fewer WPTSs may be implemented. Likewise, although WPRC 550A/550B is depicted as receiving wireless power from two WPTSs and then three WPTSs in FIG. 5A and FIG. 5B, respectively, any number of WPTSs may deliver wireless power to WPRC 550A/550B. Additionally, although only one WPRC 550A/550B is depicted, the collection of WPTSs can service any number of WPRCs concurrently using appropriate scheduling and can form a virtual WPTS for each respective WPRC.

Figure 6A:
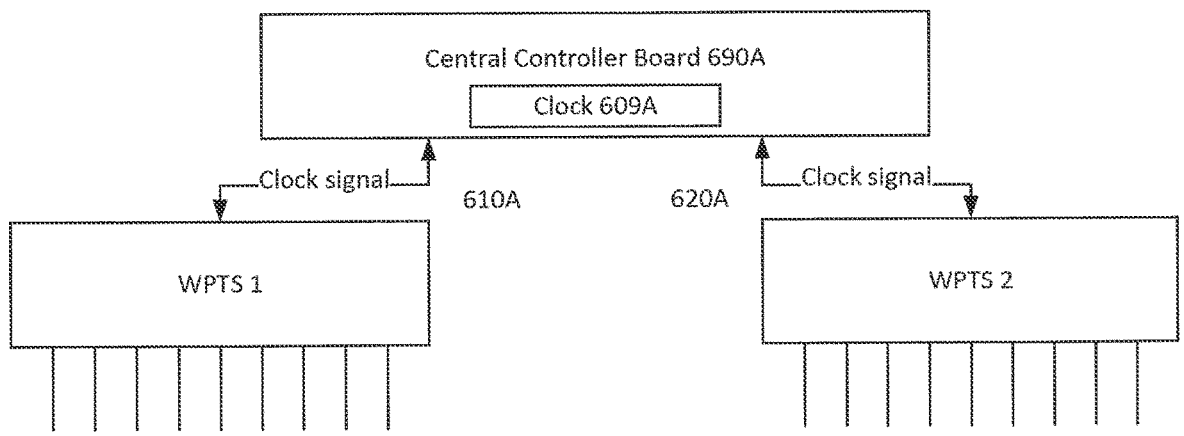
FIGS. 6A, 6B, and 6C are diagrams of example topologies in which a common clock source may be shared in a multiple WPTS system.
Figure 6B:
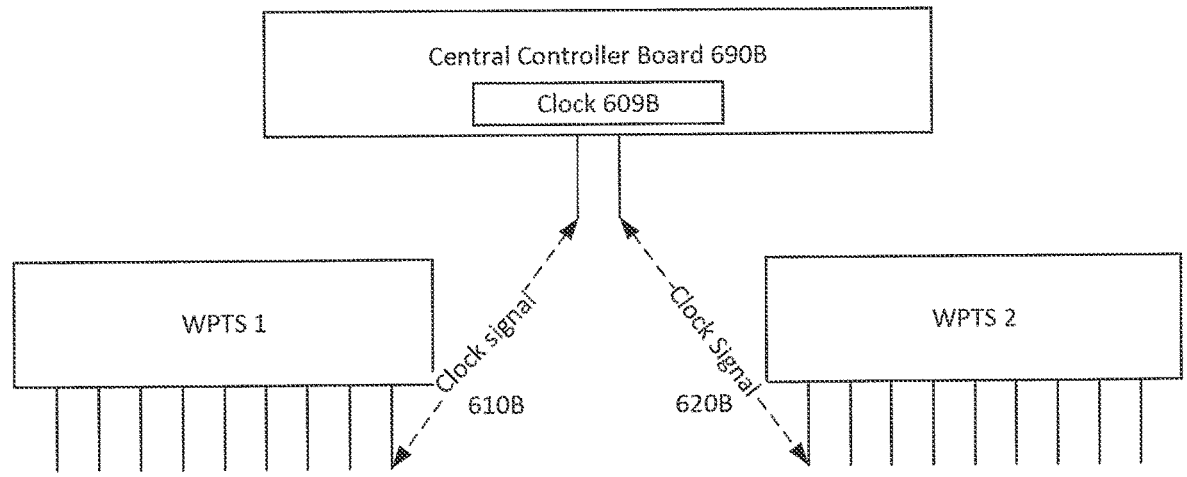
Figure 6C:
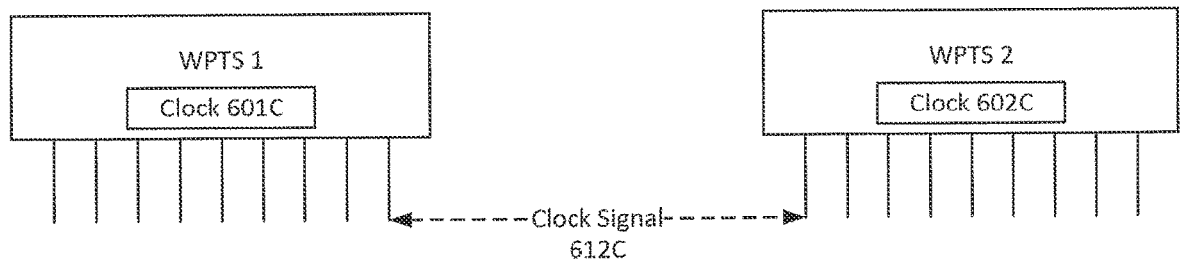

FIGS. 6A, 6B, and 6C are diagrams depicting example topologies in which a common clock source may be shared in a multiple WPTS system. Although only two WPTSs are depicted in FIGS. 6A, 6B, and 6C, this is not limiting. Any number of WPTSs may share a common clock.

FIG. 6A depicts a CCB 690A that may be connected to WPTS 1 via connection 610A. CCB 690A may be connected to WPTS 2 via connection 620A. A clock source 609A may be included in CCB 690A and may be shared with WPTS 1 and WPTS 2 via connections 610A and 620A, respectively. The connections 610A and 620A may be a wired connection or a fiber optic connection, for example. WPTS 1 and WPTS 2 may exchange signals with CCB 690A to establish a common clock and respective phase offsets for WPTS 1 and WPTS 2 such that their wireless power transmissions may be time aligned.

FIG. 6B depicts a CCB 690B that may be connected to WPTS 1 via a wireless connection 610B. CCB 690B may be connected to WPTS 2 via a wireless connection 620B. A clock source 609B may be included in CCB 690B and may be shared with WPTS 1 and WPTS 2 via wireless connections 610B and 620B, respectively. The wireless connections 610B and 620B may be on a same frequency as wireless power transmissions or may be on a different frequency. Additionally, WPTS 1 and WPTS2 may communicate with CCB 690B via the same antennas or a portion of the same antennas via which WPTS 1 and WPTS 2 transmit wireless power to a WPRC. Additionally or alternatively, WPTS1 and WPTS 2 may use one or more different antennas that may be configured for communication with CCB 690B. WPTS 1 and WPTS 2 may exchange signals with CCB 690B to establish a common clock and respective phase offsets for WPTS 1 and WPTS 2 such that their wireless power transmissions may be time aligned.

FIG. 6C depicts WPTS 1 and WPTS 2 that may share a clock signal via a wireless connection 612C. Alternatively, although not shown, a wired connection between WPTS 1 and WPTS 2 may be used to share the clock signal. A clock source 601C may be included in WPTS 1 may be shared with WPTS 2 and/or a clock source 602C may be included in WPTS 2 and may be shared with WPTS 1 via wireless connection 612C. The wireless connection 612C may be on a same frequency as wireless power transmissions or may be on a different frequency. Additionally, WPTS 1 and WPTS2 may communicate with each other via the same antennas or a portion of the same antennas via which WPTS 1 and WPTS 2 transmit wireless power to a WPRC. Additionally or alternatively, WPTS1 and WPTS 2 may use one or more different antennas that may be configured for communication with each other. WPTS 1 and WPTS 2 may exchange signals with each other to establish a common clock and respective phase offsets for WPTS 1 and WPTS 2 such that their wireless power transmissions may be time aligned.

Figure 7:
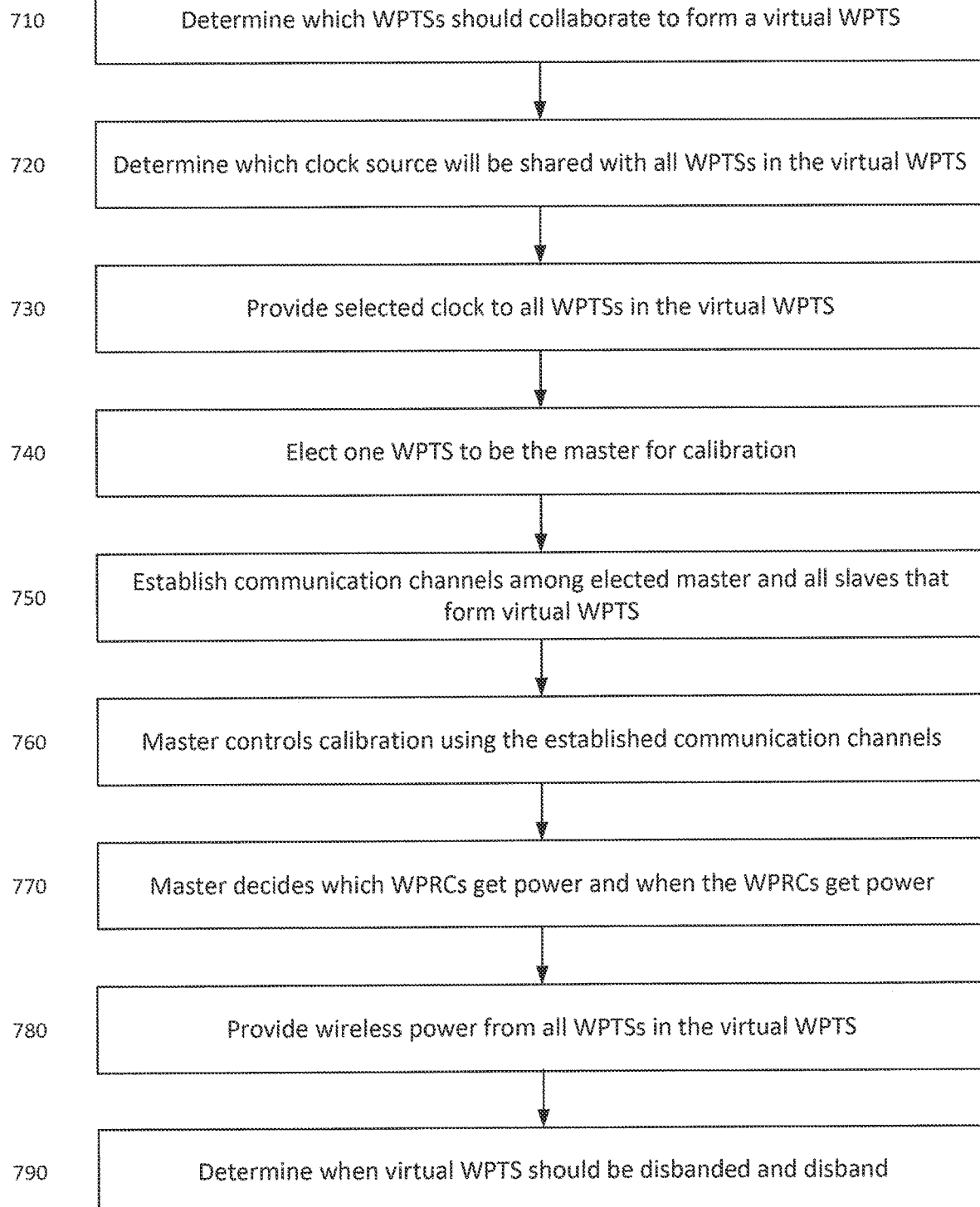
FIG. 7 is a diagram depicting an example method of a system of multiple WPTSs implementing features of a virtual WPTS.

FIG. 7 is a diagram depicting an example method 700 of a system of multiple WPTSs implementing features of a virtual WPTS in accordance with the teachings herein. At 710, it may be determined which WPTSs should collaborate to form a virtual WPTS. Such a determination may be made by a CCB and/or by one or more of the WPTSs. For example, each WPTS may independently determine that it is well-suited to power a WPRC and may transmit a signal to nearby WPTSs that it should be paired with the WPRC to provide wireless power to the WPRC. A predicted power may be used to determine whether a WPTS may be well-suited to be a part of a virtual WPTS to provide power to the WPRC. Additionally or alternatively, a WPTS may run a test with the WPRC to determine how much power transmitted by the WPTS may be received by the WPRC to then determine how well-suited the WPTS is for pairing with the WPRC. For example, all WPTSs over some selected power delivery threshold may be joined together to form the virtual WPTS. The candidate WPTSs may also exchange signaling to identify and acknowledge the determined group of WPTSs that will form the virtual WPTS.

At 720, it may be determined which clock source will be shared with all WPTSs in the virtual WPTS. One or more CCBs may be connected to the group of WPTSs forming the virtual WPTS. A clock source from one of the CCBs may be used and shared with the group of WPTSs. Alternatively, each WPTS of the group of WPTSs may include a clock source. A WPTS may share its clock source to use as a common clock source with the other WPTSs in the group of the WPTSs. The clock source may be used to adjust clock phases of each WPTS appropriately such that their respective transmissions constructively interfere at a location of the WPRC. At 730, the selected clock source may be shared with all WPTSs in the virtual WPTS. The selected clock source may be shared via a wired or wireless connection.

At 740, a WPTS of the group of WPTSs forming the virtual WPTS may be elected as the master WPTS to use for calibration of the WPTSs. Although the master WPTS is elected at 740 in FIG. 7, this particular order is not limiting. The master WPTS may be elected at any time. For example, the WPTS may be elected at 720 and the master WPTS may be used as the clock source to be shared with the other WPTSs or the master WPTS may select another WPTS to share its clock source. Once a master WPTS is elected, the other WPTSs in the group of WPTSs forming the virtual WPTS may function as slaves. At 750, communication channels may be established among the elected master and all slaves that form the virtual WPTS. Alternatively, communication channels may be established at an earlier point in the method than that depicted in FIG. 7. For example, communication channels may be established prior to or concurrently with determining which clock source will be shared in 720.

At 760, the master WPTS may control calibration of the WPTSs forming the virtual WPTS using the established communication channels. During calibration, a phase offset associated with each WPTS may be determined to synchronize transmissions across the WPTSs forming the virtual WPTS. In this way, the multiple WPTSs that may be spatially dispersed may wirelessly transmit power in a coordinated fashion to operate as a single, virtual WPTS where transmissions from all WPTSs substantially constructively interfere at a location of a WPRC.

At 770, the master WPTS may decide which WPRCs get wireless power and when the WPRCs get power. Here, apportioning of the available wireless power transmission capabilities of the virtual WPTS may take place. The available wireless power transmission capabilities may be scheduled to optimally supply power to WPRCs paired with the virtual WPTS based on, among other things, the demands of the respective WPRCs and the ability of the WPTSs forming the virtual WPTS to meet the demands. At 780, all WPTSs forming the virtual WPTS provide wireless power to the paired WPRCs in accordance with the decisions made at 770.

As wireless environment conditions change, such as a WPRC moves location or perhaps an object moves into the environment which impairs or enhances a WPTS's ability to provide wireless power to a WPRC, the virtual WPTS may need to be disbanded to form a more optimal virtual WPTS for the new environment. Thus, at 790, a determination may be made when the virtual WPTS should be disbanded and then the virtual WPTS may be disbanded. The master WPTS, for example, may be responsible for making said determination and for signaling to the slave WPTSs to disband. The determination may be made based on, for example, a change in one or more reception characteristics of a beacon from a paired WPRC. By way of example, a person may have moved into the line of sight of one of the WPTSs and a paired WPRC blocking this direct path. The blocked WPTS may signal the updated condition to the master WPTS, and the master WPTS may determine to disband the virtual WPTS such that the blocked WPTS is removed from the virtual WPTS. Additionally or alternatively, the virtual WPTS may not be fully disbanded but rather may be updated to remove the blocked WPTS only or the virtual WPTS may be fully disbanded and the method 700 may start over at 710 to determine which WPTSs should collaborate to form a new virtual WPTS.

It should be noted that the example method and particular order of steps depicted in FIG. 7 is not meant to be limiting. The steps as depicted in FIG. 7 may be rearranged, combined, omitted, sub-divided, or otherwise modified and still fall within the scope of the embodiments described herein.

The following description provides details for calibrating an antenna for synchronized wireless power transmission with other antennas in the system to compensate for differences in phases of local clocks. By calibrating a phase offsets for each antenna, the system can ensure that signals constructively interfere at a location of a paired WPRC. For more details on embodiments of performing said calibration across antennas within a WPTS, please refer to U.S. patent application Ser. No. 15/596,661 filed May 16, 2017 and titled, "TECHNIQUES FOR CALIBRATING WIRELESS POWER TRANSMISSION SYSTEMS FOR OPERATION IN MULTIPATH WIRELESS POWER DELIVERY ENVIRONMENTS", the contents of which are hereby incorporated by reference herein.

Figure 8:
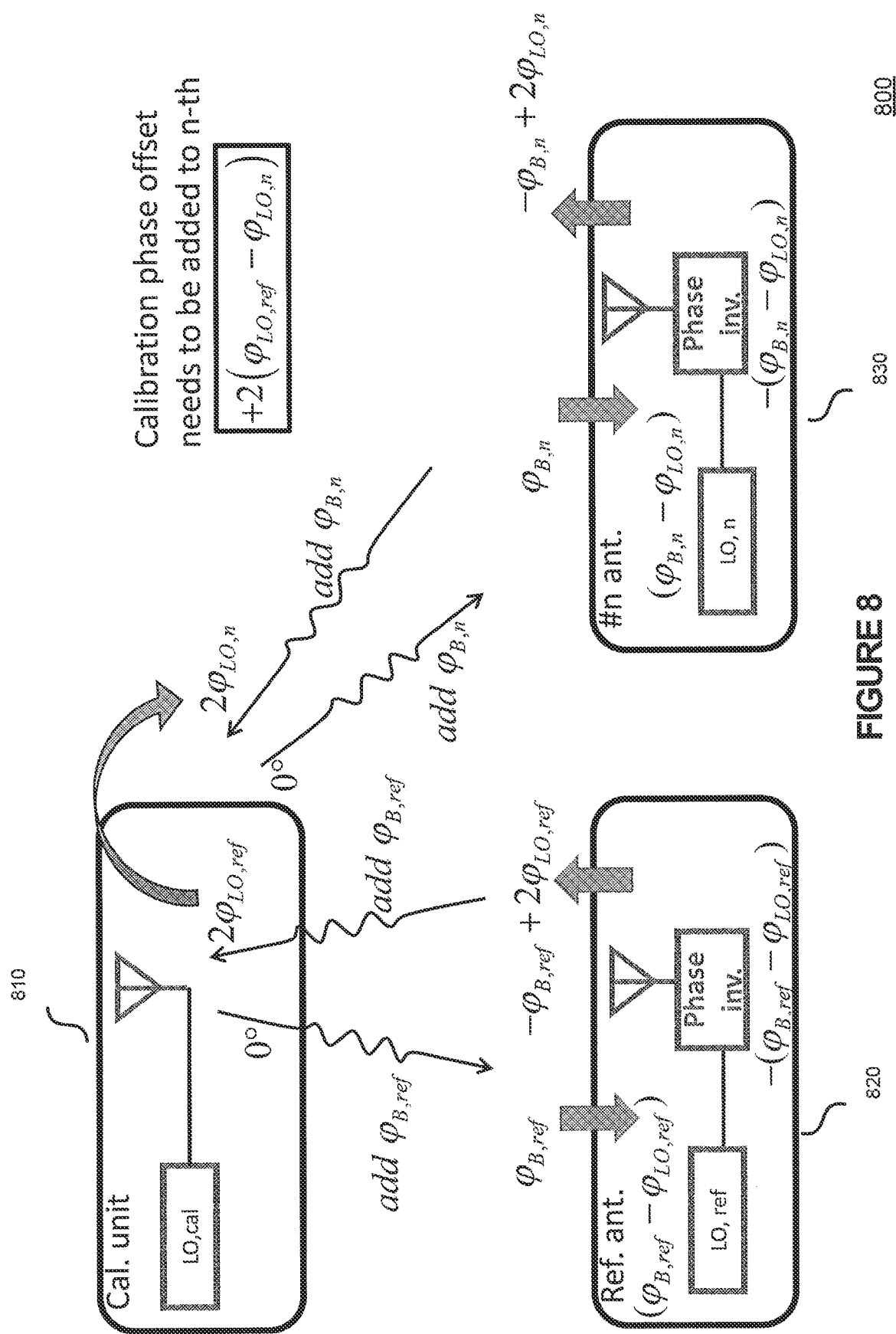
FIG. 8 is a diagram depicting an example system for calibrating an antenna for synchronized transmission with other antennas in the system.

FIG. 8 is a diagram depicting an example system 800 for calibrating an antenna for synchronized transmission with other antennas in the system. FIG. 8 depicts a calibration unit 810, Cal. unit, including a local oscillator, LO, cal, coupled a respective antenna. FIG. 8 further depicts a reference unit 820, Ref. ant., including a local oscillator, LO, ref, a respective phase invertor, and a respective antenna. FIG. 8 further depicts a device under test 830, #n ant., including a local oscillator, LO, n, a respective phase invertor, and a respective antenna. The local oscillators may act as a clock source for the respective devices. Respective transmissions from the depicted devices are based on the phases of the respective local oscillators, or clock sources, of the depicted devices. FIG. 8 further depicts various signals transmitted to and from calibration unit 80, reference unit 820, and device under test 830 along with phases introduced by their respective local oscillators. By calibrating transmissions from the device under test 830 so that the phase shift introduced by its local oscillator matches that of the reference unit 820, the system may achieve synchronized transmissions across the reference unit 820 and the device under test 830.

The calibration unit 810 may send a transmission that is received by the reference unit 820 and the device under test 830, respectively. The transmission, when received at the reference unit 820, may include a phase shift of $\varphi_{B,ref}$. The transmission, when received at the device under test 830, may include a phase shift of $\varphi_{B,n}$. A phase of the received transmission at the reference unit 820 with respect to its local oscillator may be expressed as $\varphi_{B,ref}-\varphi_{LO,ref}$. A phase of the received transmission at the device under test 830 with respect to its local oscillator may be expressed as $\varphi_{B,n}-\varphi_{LO,n}$. These signals may then be inverted and transmitted back to the calibration unit 810, again based upon a respective phase of their respective local oscillators. Thus, reference unit 820 may transmit a signal with a phase shift of $-\varphi_{B,ref}+2\varphi_{LO,ref}$ and device under test 830 may transmit a signal with a phase shift of $-\varphi_{B,b}+2\varphi_{LO,n}$. The transmission from reference unit 820, when received at the calibration unit 810, may then include another phase shift of $\varphi_{B,ref}$ added to the $-\varphi_{B,ref}+2\varphi_{LO,ref}$, which results in a received transmission with a phase shift of $2\varphi_{LO,ref}$. The transmission from device under test 830, when received at the calibration unit 810, may then include another phase shift of $\varphi_{B,n}$ added to the $-\varphi_{B,n}+2\varphi_{LO,n}$, which results in a received signal with a phase shift of $2\varphi_{LO,n}$. Through this round-trip transmission between the calibration unit 810 and the reference unit 820, as well as the round-trip transmission between the calibration unit 810 and the device under test 830, the calibration unit is able to gather enough information to determine the phase shifts introduced by the respective oscillators, or clock sources, of the reference unit 820 and the device under test 830, since it now received transmissions with known relationships to the phase shift introduced by respective local oscillators. The calibration unit 810 may then provide clock signal information to the device under test 830 so that the device under test may adjust its oscillator, or clock, phase by $+2(\varphi_{LO,ref}-\varphi_{LO,n})$ so that signals transmitted by the device under test 830 are aligned with signals transmitted from the reference unit 820.

The above described calibration with respect to FIG. 8 may be applied to any antenna within a multiple WPTS system. Within a single WPTS, a calibration may be needed across all antennas and their respective local oscillators to properly compensate phase shifts per antenna. In this example scenario, an antenna of the WPTS may be designated as a reference antenna, and the remaining antennas may be designated as a device under test that are each calibrated with respect to the reference antenna. In this example, the calibration unit may be another WPTS, a WPRC, or a calibration unit specifically designed for calibration purposes.

As described herein, to form a virtual WPTS, there may be a need to calibrate transmissions across all WPTSs that form the virtual WPTS. For example, there may be a need to calibrate transmissions from antennas of a second WPTS with respect to a first WPTS. In this example scenario, the calibration depicted in FIG. 8 and described above may be applied. For two WPTSs, a calibration of clock phases of all antennas within the first WPTS may be done with respect to the clock of its reference antenna. Similarly, a separate calibration of each clock coupled to each antenna within the second WPTS may be done with respect to the clock of its reference antenna as well. Additionally, the reference antenna of the second WPTS may be calibrated with respect to the reference antenna of the first WPTS in accordance with FIG. 8. For example, the reference antenna of the second WPTS may be the device under test 830 and the reference antenna of the first WPTS may be the reference unit 820 as shown in FIG. 8. As a result, the clocks of the second WPTS may be offset such that transmissions from the second WPTS may be aligned with transmissions from the first WPTS. Thus, the system need not explicitly calibrate all antennas from the second WPTS with respect to the first WPTS, but may effectively achieve calibration across all antennas of both WPTSs by calibrating the reference antenna of the second WPTS with respect to the first WPTS. Thus, as depicted in FIG. 5-7 and as described in their associated descriptions, the local oscillators, or clock sources, of all WPTSs that form a virtual WPTS may be calibrated and clock signal information may be shared among the WPTSs.

Figure 9:
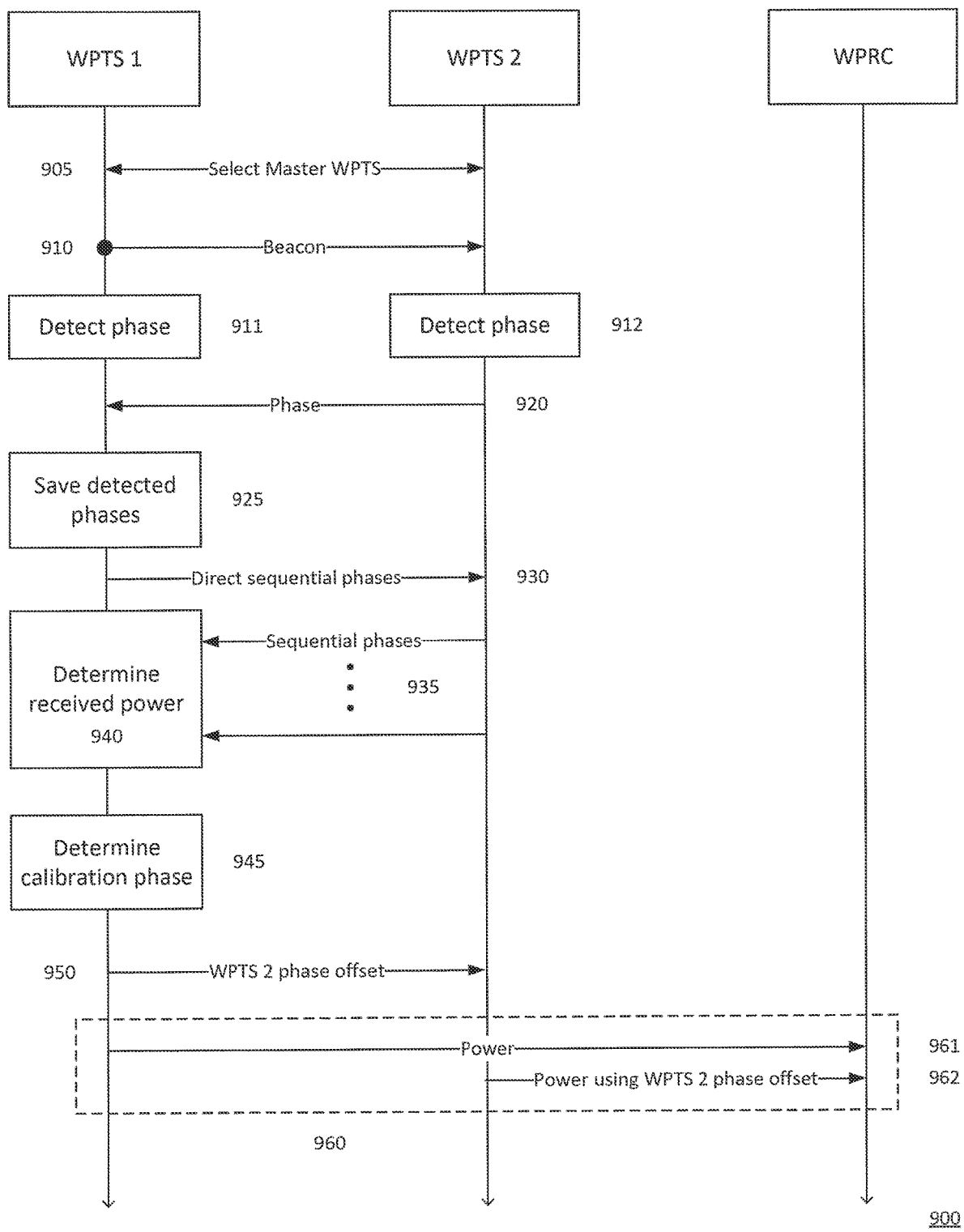
FIG. 9 is a signal flow diagram depicting an example system including two WPTSs that are calibrated to act as a virtual WPTS to provide wireless power to a WPRC.

FIG. 9 is a signal flow diagram 900 depicting an example system including two WPTSs, WPTS 1 and WPTS 2, that may be calibrated to act as a virtual WPTS to provide wireless power to a WPRC. In this example system, the WPTS 1 may act as a master WPTS and may further act as a calibration unit 810 as well as reference unit 820 such as that depicted in FIG. 8. For example, transmissions from one or more antennas of WPTS 1 may act as calibration unit antennas and may be received by another antenna that may act as a reference antenna included in WPTS 1. The reference antenna included in WPTS 1 may transmit signals back to the one or more calibration unit antennas included in WPTS 1. A reference antenna included in WPTS 2 may act as a device under test such as device under test 830 depicted in FIG. 8. The reference antenna from WPTS 2 may also receive transmissions from the one or more calibration unit antennas included in WPTS 1 and may transmit signals back to the one or more calibration unit antennas included in WPTS 1. As described above with respect to FIG. 8, WPTS 1 may then be able to supply clock information to WPTS 2 so that it may adjust a phase offset of its reference antenna to align transmissions with those of WPTS 1.

As depicted in FIG. 9, at 905 a master WPTS is selected. In the example depicted in FIG. 9, WPTS 1 may be selected as the master. At 910, the one or more antennas acting as calibration unit antennas may transmit a beacon that may be received by an antenna chosen as a reference antenna of WPTS 2 and by an antenna chosen as a reference antenna of WPTS 1. Each reference antenna may detect a received phase at 911 and 912, respectively. At 920, WPTS 2 may transmit an indication of the phase detected at its reference antenna back to WPTS 1. At 925, WPTS 1 may save an indication of the detected phase. At 925, WPTS 1, which may include both its reference antenna and the one or more calibration unit antennas, may also save the phase detected by its reference antenna from the transmission from the one or more calibration unit antennas.

At 930, WPTS 1 may direct WPTS 2 to send transmissions via its reference antenna at sequential phases. At 935, WPTS 2 may transmit signals with sequentially incremented or decremented phase shifts. For example, a phase shift of the local oscillator associated with the reference antenna of WPTS 2 may be incremented or decremented sequentially and corresponding transmissions using the different phase shifts may be transmitted by the reference antenna of WPTS 2. These sequential transmissions may be received by the one or more calibration unit antennas of WPTS 1. Concurrently, a reference antenna of WPTS 1 may transmit a signal that is received by the one or more calibration unit antennas of WPTS 1. As the sequential transmissions from the reference antenna of WPTS 2 and the concurrent transmissions from the reference antenna of WPTS 1 are received by the one or more calibration unit antennas of WPTS 1, at 940 a sum received power from both of the reference antennas is determined. At 940, as the phase shift is incremented or decremented throughout the sequential transmissions from the reference antenna of WPTS 2, a received power level is determined for each of the sequential transmissions. A peak received power at the one or more calibration unit antennas may correspond to a particular transmission selected from the sequential transmissions wherein a phase shift of the selected transmission from the reference antenna of WPTS 2 is substantially calibrated with a phase of the transmission from the reference antenna of WPTS 1. At 945, the phase shift that corresponds to the peak power is determined.

At 950, WPTS 1 shares an indication of the calibration phase shift that corresponds to the peak power with WPTS 2. At 960, WPTS 1 and WPTS 2 may act as a virtual WPTS and may concurrently send calibrated transmissions to the WPRC. At 961, WPTS 1 may directionally transmit power to the WPRC while, at 962, WPTS 2 may concurrently and directionally transmit power using the indication of the calibration phase shift so that transmissions from WPTS 2 constructively interfere with transmissions from WPTS 1 at a location of the WPRC.

Figure 10:
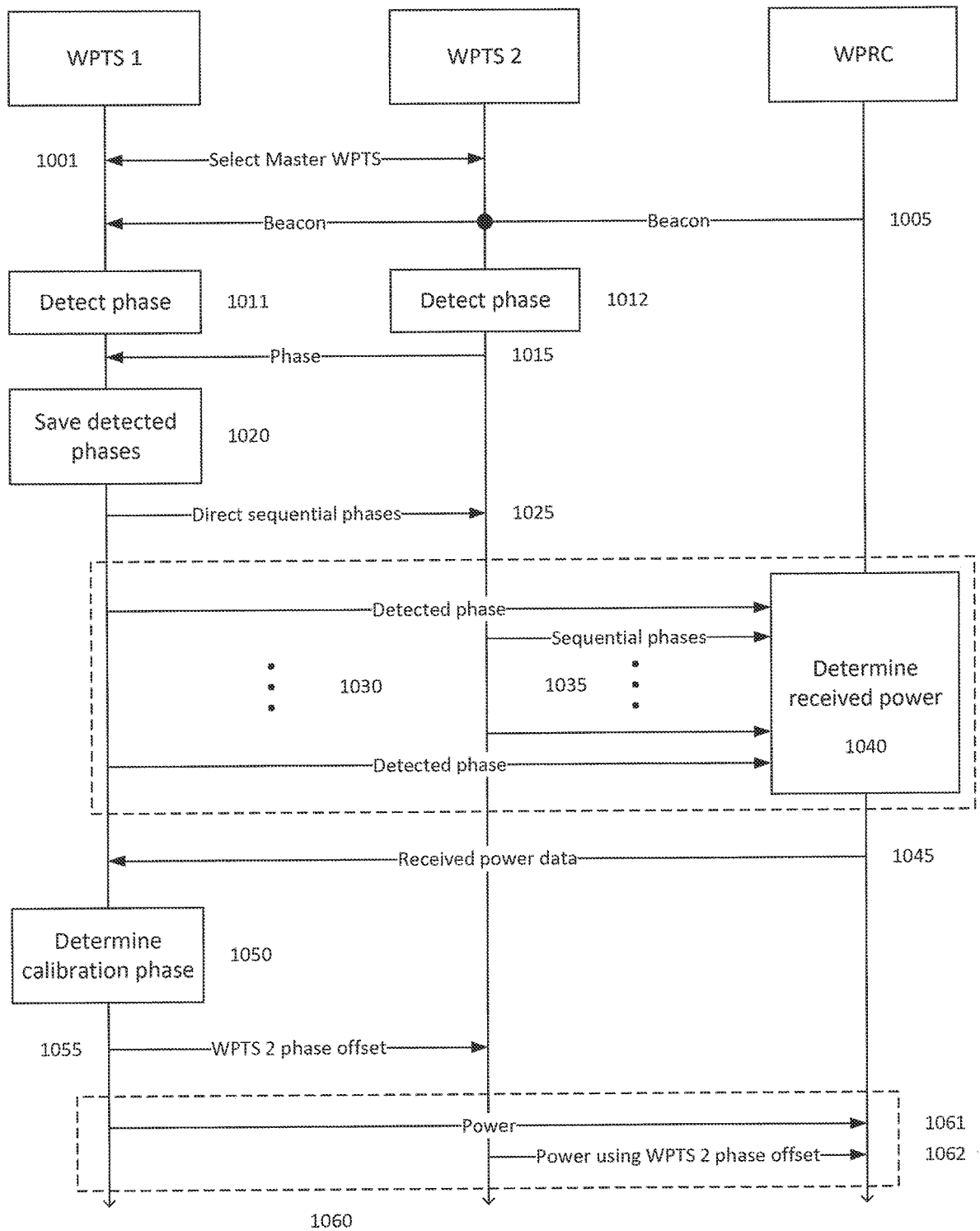
FIG. 10 is a signal flow diagram depicting another example system including two WPTSs that are calibrated to act as a virtual WPTS to provide wireless power to a WPRC.

FIG. 10 is a signal flow diagram 1000 depicting another example system including two WPTSs, WPTS 1 and WPTS 2, that are calibrated to act as a virtual WPTS to provide wireless power to a WPRC. In this example system, the WPTS 1 may act as a master WPTS and a reference unit 820 such as that depicted in FIG. 8. The WPRC may act as a calibration unit such as calibration unit 810 depicted in FIG. 8. WPTS 2 may act as a device under test such as device under test 830 depicted in FIG. 8. For example, transmissions from one or more calibration unit antennas included in WPRC may be received by a reference antenna included in WPTS 1. The antenna acting as the reference antenna included in WPTS 1 may transmit signals back to the one or more calibration unit antennas included in the WPRC. The reference antenna included in WPTS 2 may also receive transmissions from the one or more calibration unit antennas included in the WPRC and may transmit signals back to the one or more calibration unit antennas included in the WPRC. As described above with respect to FIG. 8, WPTS 1 may then be able to supply clock information to WPTS 2 so that it may adjust a phase offset of its reference antenna to align transmissions with those of WPTS 1. Although FIG. 10 depicts a WPRC, a dedicated calibration unit or another WPTS may be used in place of the WPRC to perform the depicted calibration processes.

As depicted in FIG. 10, at 1001 a master WPTS is selected. In the example depicted in FIG. 10, WPTS 1 may be selected as the master. At 1005, the WPRC may transmit a beacon that may be received by a reference antenna of WPTS 2 and by a reference antenna of WPTS 1. Each reference antenna may detect a received phase at 1011 and 1012, respectively. At 1015, WPTS 2 may transmit an indication of the phase detected at its reference antenna back to WPTS 1. At 1020, WPTS 1 may save indications of the detected phases from 1011 and 1012.

At 1025, WPTS 1 may direct WPTS 2 to send transmissions via its reference antenna at sequential phases. At 1035, WPTS 2 may transmit signals with sequentially incremented or decremented phase shifts. For example, a phase shift of the local oscillator associated with the reference antenna of WPTS 2 may be incremented or decremented sequentially and corresponding transmissions using the different phase shifts may be transmitted by the reference antenna of WPTS 2. These sequential transmissions may be received by the WPRC. Concurrently, at 1030, a reference antenna of WPTS 1 may transmit a signal with a phase based on the received beacon from the WPRC. As the sequential transmissions 1035 from the reference antenna of WPTS 2 and the concurrent transmissions 1030 from the reference antenna of WPTS 1 are received by the WPRC, at 1040 a sum received power from the transmissions from both of the reference antennas is determined. At 1040, as the phase shift is incremented or decremented throughout the sequential transmissions from the reference antenna of WPTS 2, a received power level is determined for each of the sequential transmissions. A peak received power at the WPRC may correspond to a particular transmission selected from the sequential transmissions 1035 wherein a phase shift of the selected transmission from the reference antenna of WPTS 2 is substantially calibrated with a phase of the transmission from the reference antenna of WPTS 1. At 1045, an indication of the received power data is transmitted from the WPRC to WPTS 1. At 1050, the phase shift that corresponds to the peak power is determined.

At 1055, WPTS 1 shares an indication of the calibration phase shift that corresponds to the peak power with WPTS 2. At 1060, WPTS 1 and WPTS 2 may act as a virtual WPTS and may concurrently send calibrated transmissions to the WPRC. At 1061, WPTS 1 may directionally transmit power to the WPRC while at 1062 WPTS 2 may concurrently and directionally transmit power using the indication of the calibration phase shift so that transmissions from WPTS 2 constructively interfere with transmissions from WPTS 1 at a location of the WPRC.

Again, as referenced above, the WPRC depicted in FIG. 10 may alternatively be a dedicated calibration unit or another WPTS for purposes of calibration. Once calibration is successfully achieved, WPTS 1 and WPTS 2 may form a virtual WPTS that may wireless transmit power to a WPRC in an optimal fashion.

Although two WPTSs and a WPRC are depicted in FIGS. 9 and 10, any number of WPTS may be used. Moreover, as referenced above, a separate calibration unit may be used to calibrate WPTS 1 and WPTS 2. A separate calibration unit need not be collocated with WPTS 1, WPTS 2, or the WPRC.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a WPTS or WPRC.

What is claimed is:
1. A method performed by a first wireless power transmission system (WPTS), the method comprising:
    transmitting a beacon from one or more calibration antennas of the first WPTS;

receiving the beacon at a reference antenna of the first WPTS;

receiving an indication of a phase of the beacon detected at a reference antenna of a second WPTS;

sending a signal to direct the second WPTS to send transmissions via its reference antenna at sequential phases;

concurrently receiving, at the one or more calibration antennas, at least one of the transmissions at sequential phases from the reference antenna of the second WPTS and a signal from the reference antenna of the first WPTS;

determining a sum received power of each of the received transmissions from the reference antenna of the second WPTS with the signal from the reference antenna of the first WPTS, wherein the determining includes identifying a calibration phase shift associated with a peak received power of the determined sums;

sending an indication of the calibration phase shift to the second WPTS; and directionally transmitting first wireless power transmissions to a wireless power receive client (WPRC) in collaboration with the second WPTS, wherein the first wireless power transmissions at a location of the first WPTS are phase offset from second wireless power transmissions at a location of the second WPTS based on the calibration phase offset.

2. The method of claim 1, further comprising communicating with the second WPTS to negotiate a master WPTS.

3. The method of claim 2, further comprising determining the first WPTS to be the master WPTS based on the negotiating.

4. The method of claim 1, wherein the concurrently directionally transmitting the first wireless power to the WPRC is done concurrently with the second wireless power transmissions from the second WPTS.

5. The method of claim 4, wherein first wireless power transmissions constructively interfere with the second wireless power transmissions at a location of the WPRC.

6. The method of claim 1, wherein the calibration phase offset adjusts a phase of a local oscillator of the second WPTS.

7. The method of claim 1, wherein the signal to direct the second WPTS to send transmissions via its reference antenna at sequential phases indicates to the second WPTS to either sequentially increment or sequentially decrement the respective phases of the transmissions.

8. The method of claim 1, further comprising:
receiving, at the reference antenna of the first WPTS, a WPRC beacon transmission from the WPRC; and
determining a phase of the WPRC beacon transmission as received at the first WPTS.

9. The method of claim 8, further comprising receiving, from the second WPTS, an indication of a phase of the WPRC beacon transmission as received at the second WPTS.

10. The method of claim 8, further comprising directionally transmitting third wireless power transmissions to the WPRC in collaboration with the second WPTS based on a detected phase of a peak received wireless power at the WPRC.

11. A first wireless power transmission system (WPTS), the first WPTS comprising:
a transceiver;
a plurality of antennas including one or more calibration antennas and a reference antenna;
the transceiver configured to transmit a beacon via the one or more calibration antennas;
the transceiver further configured to receive the beacon via the reference antenna;
the transceiver further configured to receive, via one or more antennas of the plurality of antennas, an indication of a phase of the beacon detected at a reference antenna of a second WPTS;
the transceiver further configured to send, via at least one antenna of the plurality of antennas, a signal to direct the second WPTS to send transmissions via its reference antenna at sequential phases;
the transceiver further configured to concurrently receive, via the one or more calibration antennas, at least one of the transmissions at sequential phases from the reference antenna of the second WPTS and a signal from the reference antenna of the first WPTS;
a processor configured to determine a sum received power of each of the received transmissions from the reference antenna of the second WPTS with the signal from the reference antenna of the first WPTS, and to identify a calibration phase shift associated with a peak received power of the determined sums;
the transceiver further configured to send, via the at least one antenna, an indication of the calibration phase shift to the second WPTS; and
the transceiver further configured to directionally transmit, via at least some of the plurality of antennas, first wireless power transmissions to a wireless power receive client (WPRC) in collaboration with the second WPTS, wherein the first wireless power transmissions at a location of the first WPTS are phase offset from second wireless power transmissions at a location of the second WPTS based on the calibration phase offset.

12. The first WPTS of claim 11, wherein transceiver is further configured to communicate, via the at least one antenna, with the second WPTS to negotiate a master WPTS.

13. The first WPTS of claim 12, wherein the processor is further configured to determine the first WPTS to be the master WPTS based on the negotiating.

14. The first WPTS of claim 11, wherein the transceiver is further configured to directionally transmit, via the at least some of the plurality of antennas, the first wireless power to the WPRC concurrently with the second wireless power transmissions from the second WPTS.

15. The first WPTS of claim 14, wherein first wireless power transmissions constructively interfere with the second wireless power transmissions at a location of the WPRC.

16. The first WPTS of claim 11, wherein the calibration phase offset adjusts a phase of a local oscillator of the second WPTS.

17. The first WPTS of claim 11, wherein the signal to direct the second WPTS to send transmissions via its reference antenna at sequential phases indicates to the second WPTS to either sequentially increment or sequentially decrement the respective phases of the transmissions.

18. The first WPTS of claim 11, wherein:
the transceiver is further configured to receive, via the reference antenna, a WPRC beacon transmission from the WPRC; and
the processor is further configured to determine a phase of the WPRC beacon transmission as received at the first WPTS.

19. The first WPTS of claim 18, wherein the transceiver is further configured to receive from the second WPTS, via the one or more antennas, an indication of a phase of the WPRC beacon transmission as received at the second WPTS.

20. The first WPTS of claim 18, wherein the transceiver is further configured to directionally transmit, via the at least some of the plurality of antennas, third wireless power transmissions to the WPRC in collaboration with the second WPTS based on a detected phase of a peak received wireless power at the WPRC.

\* \* \* \* \*